Patented Jan. 7, 1941

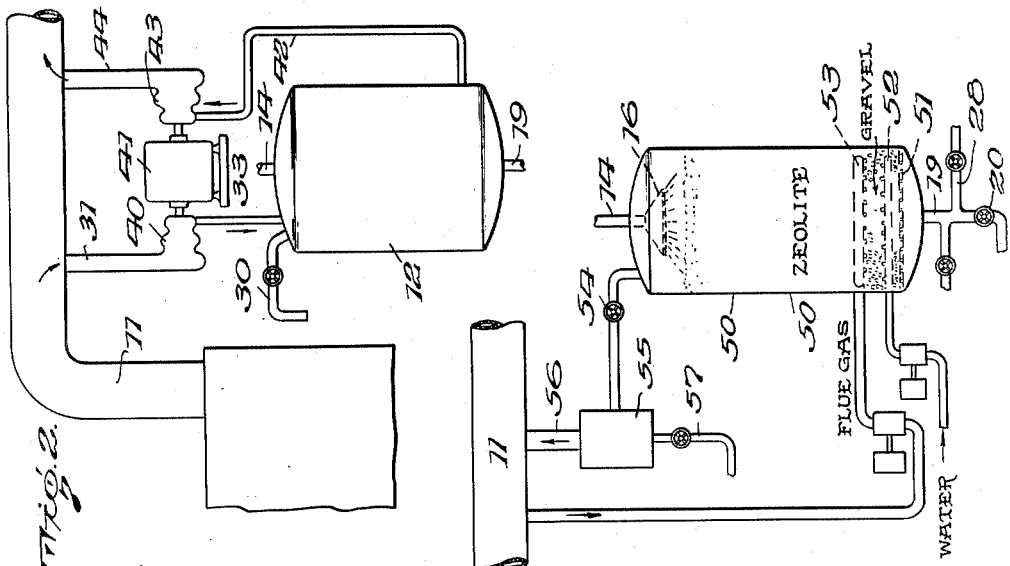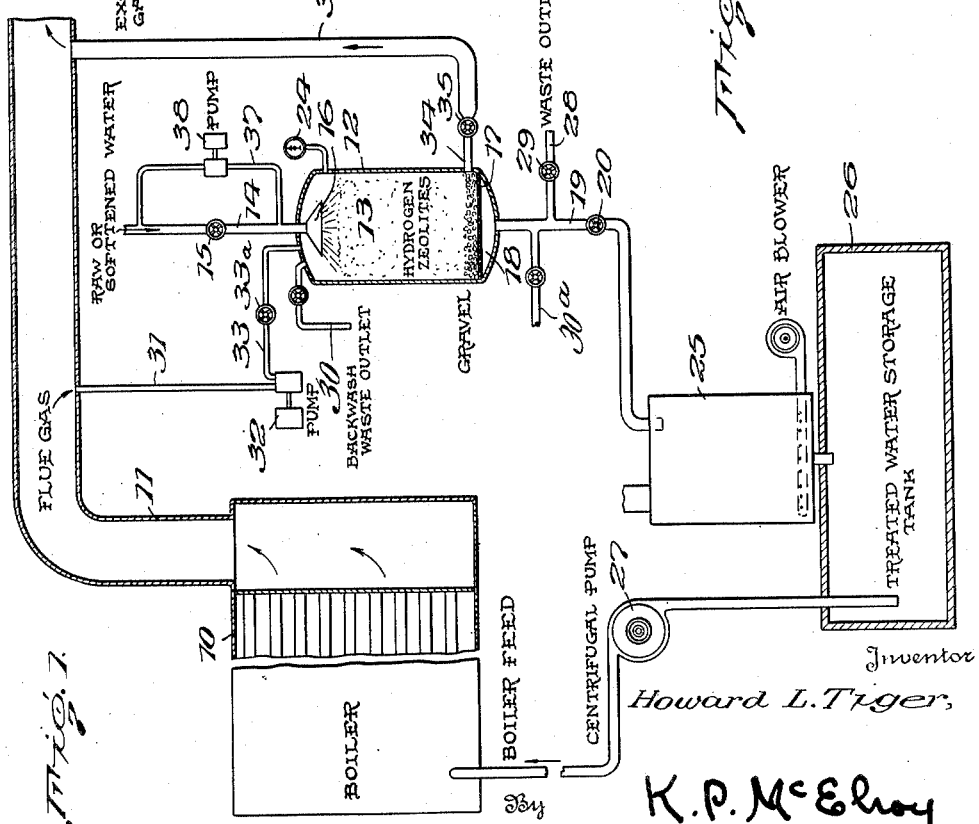

2,227,520

UNITED STATES PATENT OFFICE 2,227,520

PURIFYING WATER

Howard L. Tiger, New York, N. Y., assignor to The Permutit Company, New York, N. Y., a corporation of Delaware Application April 13, 1938, Serial No. 201,812

9 Claims. (Cl. 210—24)

This invention or discovery relates to purifying water; and it comprises an improvement in methods of lowering the saline content of waters with acid regenerated carbonaceous zeolites wherein regeneration is effected by waste gases containing carbon dioxide or sulfur dioxide, or both, passed together with water and preferably under pressure into contact with the zeolites, the method being useful in softening raw waters by base removal and particularly useful as an after treatment of softened waters and other waters containing sodium compounds such as the bicarbonate; and it also comprises as a new assemblage of apparatus elements, useful in the performance of the method, a water softener of ordinary type charged with base removing carbonaceous zeolites and adapted to operate under pressure, a source of waste gases such as flue gases, pumping means for introducing the gases into the softener and appropriate check and reducing valves to permit the softener to be run under pressure during the regenerating phase; flue gases often being taken from a boiler furnace and the water treated in the apparatus going to the boiler; all as more fully hereinafter set forth and as claimed.

In softening hard water, it has been customary to use exchange silicates or zeolites carrying exchangeable sodium. In softening water by base exchange, the calcium and magnesium ions in the water are taken up by the zeolite which gives up sodium in exchange. After a period of use, the zeolite is regenerated with a solution of common salt, sodium once more entering the zeolite as an exchangeable base displacing calcium and magnesium from the zeolite. Water containing sodium bicarbonate is soft and is desirable for many uses. In this operation, however, there is no reduction of the total solids in solution in the water, one saline being substituted for another. If, however, regeneration be by dilute acid instead of NaCl, the zeolite now contains exchangeable hydrogen; it is a "hydrogen ion zeolite." On treating hard water with a hydrogen zeolite the hardness giving cations are taken up by the zeolite in exchange for hydrogen and the saline content of the water is thereby reduced. The effluent is somewhat acid but insofar as this is due to carbonic acid it is immaterial since the $CO_2$ can be readily removed. The strong mineral acids, $H_2SO_4$ and HCl, derived from sulfates and chlorides in the raw water may be neutralized or otherwise disposed of.

For boiler waters the use of a hydrogen zeolite offers manifest advantages and particularly as an after treatment of softened waters containing sodium compounds. The difficulty arises, however, that siliceous base exchange zeolites are rarely resistant to regeneration with acid. It is a matter of some difficulty to find a siliceous material which will stand up and retain its exchange power under repeated regenerations with acids over long periods of time. Recently, however, there have come into use "carbonaceous zeolites" made in various ways from coal and humus materials. These carbonaceous non-siliceous zeolites have not only a good exchange capacity, but they are particularly resistant to acids. It is feasible to produce carbonaceous zeolites which will stand up in a softener over a long period with regeneration by dilute sulfuric acid or hydrochloric acid.

These carbonaceous zeolites used with acid regeneration are well adapted for work with boiler waters. They will remove not only calcium and magnesium from water, but sodium as well, so that as stated they may be used for lessening the dissolved saline content of waters softened in other ways and containing sodium bicarbonate; waters softened by ordinary zeolites, by soda lime precipitation, etc.

There are natural waters containing sodium bicarbonate and these can be treated with the same advantage, using acid regenerated carbonaceous zeolites.

The advantages of reducing sodium alkalinity to a minimum, while at the same time removing the hardness, are known and are particularly evident in the field of boiler feedwater treatment. Here the removal of alkalinity results in a corresponding reduction of total dissolved solids. This in turn proportionately reduces the amount of blowoff required to maintain the concentration of total solids in the boiler salines below the safe maximum limit, this limit being continually lowered as a practical matter with the increasing operating pressures in modern boilers. At the same time, this reduced alkalinity reduces the amount of bicarbonate or carbonate that is available for decomposition in the boiler salines with the resultant formation of $CO_2$ that is liberated with the steam. Such $CO_2$ is particularly undesirable where there are long condensate lines as in the case of central heating systems, because in such plants the $CO_2$ present in the steam may dissolve in the condensate and make this condensate more corrosive in the return lines. Still another advantage of the low alkalinity is the fact that it makes it possible more readily to maintain the desired high sulfate: carbonate ratios usually recommended for power boilers. In most cases the alkalinity reduction possible with a carbonaceous hydrogen zeolite produces the proper sulfate:carbonate ratio with the sulfate that was originally present in the raw water; if this does not suffice, it is merely necessary to add a little more sodium sulfate.

As carbonaceous zeolites useful in the present invention, granulated natural lignites and humus bodies having suitable physical characteristics and a sufficiently high capacity for ion exchange may be employed with merely such treatment as is necessary to give mechanical strength and rigidity. Better preparations can be made by chemically altering these humic substances with strong reagents, such as sulfuric acid, zinc chloride, etc.; the treatment not being carried to the point of carbonization with production of carbon as such. In using sulfuric acid in excess of granulated soft coal, a highly active and rugged carbonaceous zeolite may be produced which, after acid regeneration, will remove cations not only from water containing carbonates but also from water containing sulfates and chlorides.

In regenerating a carbonaceous zeolite, any dilute mineral acid, sulfuric or hydrochloric acid, in 1 or 2 per cent concentration can be used. This is passed through the zeolite bed which is afterwards rinsed. These acids require non-corrodible equipment, and, when purchased in relatively small quantities, their cost may be fairly high, thereby resulting in correspondingly high operating cost.

I have discovered that in lieu of using these strong acids for regeneration, I can use relatively weak gaseous acidic oxides such as $CO_2$ or $SO_2$, either or both in the form of ordinary flue gases. These acidic gaseous substances, being waste materials, provide regeneration of the hydrogen zeolite at practically no cost. At the same time, such flue gas regeneration possesses certain advantages:

First, the regeneration is only carried to the point where a limited proportion of hydrogen zeolite is formed in the bed so that only enough hydrogen is introduced into the treated water to convert most but not all of the bicarbonates into $H_2CO_3$. As stated above, this $H_2CO_3$ is readily removed by simple aeration. The chlorides and sulfates that are not affected by the zeolite remain in the water in the form of the neutral sodium salts. Neutralization is not required as is the case when regenerating with strong mineral acids such as $H_2SO_4$, which convert the bed more fully into hydrogen zeolite so that the chlorides and sulfates are in turn converted into the corresponding HCl and $H_2SO_4$.

A second advantage of utilizing flue gas in regeneration in addition to its being available in boiler plants at practically no cost (only the negligible cost of pumping), is that such utilization simplifies the equipment by eliminating the need for large and expensive non-corrodible equipment for storing and handling strong acids. It thereby saves valuable installation space, in addition to reducing the initial cost.

A third advantage with such weakly acidic gaseous regeneration is that there is no possibility of excess acid finding its way into the final treated water, because an excess of the gaseous regenerating medium automatically escapes into the atmosphere in the aerator (degasifier) that usually follows such hydrogen zeolite treating equipment for the decomposition of the $H_2CO_3$ as described above.

Usually in practice the $CO_2$-containing flue gases are taken from a convenient point in the boiler breeching or stack, whence they are pumped into the softener for regeneration with a flow of water in amount giving a relatively high concentration of carbonic acid. In order to increase the solubility of the $CO_2$ in the solution and thereby increase the efficiency of regeneration, it is usually desirable to carry out this regeneration under pressures higher than atmospheric: 100 lb. gauge pressure or higher is advantageous. The reaction which takes place during regeneration with $CO_2$ ($CO_2$ in solution becomes $H_2CO_3$) may be represented as follows:

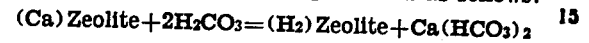

Similar equations apply to magnesium and sodium. It is necessary during regeneration to continuously admit sufficient water to carry off the bicarbonates of calcium, magnesium and sodium resulting from this regeneration. Where the calcium content of the water is fairly high, this may require a fairly large volume of regenerating water because the solubility of the $Ca(HCO_3)_2$ is relatively low. In such cases, therefore, it may be advisable to remove the hardness (calcium and magnesium) by sodium zeolite softening prior to passing it through the flue gas regenerated hydrogen zeolite. With such an arrangement, the hydrogen zeolite merely removes the sodium cation from solution and thus during the regeneration, it is only necessary to carry off the resultant $NaHCO_3$ which is very much more soluble and therefore requires much less regenerating liquid.

Thus it is often desirable to utilize this flue gas regenerated hydrogen zeolite unit in conjunction with the usual type of salt regenerated sodium zeolite unit. In such an arrangement, the hydrogen zeolite follows the sodium zeolite unit, removing the bulk of the $NaHCO_3$ therefrom with a corresponding reduction in total solids and an increase in sulfate : carbonate ratio, all of which is accomplished without appreciable added operating cost. It is apparent that such hydrogen zeolite units can frequently be installed to advantage to follow existing sodium zeolite base exchange softeners.

In the accompanying drawing are shown, more or less diagrammatically, two examples of apparatus within the purview of the invention and susceptible of use in the performance of the described process.

Fig. 1 is a diagrammatic view of a boiler in combination with a softener arrangement for flue gas regeneration; and Fig. 2 is a diagrammatic view of a modification of the flue gas circulating means.

Fig. 3 is a diagrammatic view of another and modified means for zeolite regeneration by flue gas in boiler water treatment.

In the drawing, Fig. 1 illustrates the system of the invention applied to a boiler of conventional form indicated at 10, and having a stack 11. There is provided a closed container 12 adapted to contain a body or bed of granular acid treated carbonaceous zeolites 13 placed upon an underlying layer of gravel and so constructed as to be able to withstand considerable superatmospheric pressure, and to withstand the action of water containing $CO_2$ (and $SO_2$ if present). The container has an inlet conduit 14 valved as at 15, for raw or softened water, delivering to an interior distributor 16. Near the bottom of the container is a foraminous partition 17 for supporting the zeolites and leaving a sump bottom 18. A conduit 19, valved as at 20, leads from the bottom to a degasifier 25. The degasifier delivers into a storage tank 26 and from this feedwater pump 27 takes water for the boiler. A branch 28, valved at 29 on conduit 19 is provided for waste liquid. An upper valve outlet 30 on the zeolite container is also provided for waste during backwashing, and water for this backwashing may be introduced through pipe 30a.

The gas connections for the softener include a conduit 31 tapping the boiler stack as shown, and leading to a pump 32, which may be of any convenient type adapted to compress flue gas to the required pressures. The pump outlet delivers through a conduit 33 valved at 33a to the interior of the container, as shown. A pressure gauge 24 is provided on container 12. A gas outlet is provided at 34 in the lower portion of the container. A throttle valve 35 controls this outlet, and the gas issuing from the outlet is conveniently, though not necessarily, returned to the stack through a conduit 36.

A raw water by-pass 37 and pump 38 are arranged to inject water into the softener during regeneration, as described subsequently.

The operation of the system is as follows:

Assuming the zeolites to be in regenerated condition, water containing salines is introduced through conduit 14. The water may be raw water or it may be water softened by base exchange. Assuming softened water, as the water passes through the bed, sodium is removed by the zeolites and the effluent passing through conduit 19 contains the acid formed by exchange of the sodium in the softened water for acidic hydrogen of the zeolite. Assuming the raw water to contain sodium carbonate, as it passes through the zeolites sodium is taken up by the zeolite and hydrogen given to the water in exchange, so that the effluent contains carbonic acid in greater or less degree. Conduit 19 delivers to the degasifier 25, which is of any suitable known construction, being as shown blown with air. In the degasifier, $CO_2$ is driven off. As I have found, it is usually advantageous to operate the carbonaceous zeolite so as to remove from the water only the cations associated with temporary or carbonate hardness and to leave sulfates and chlorides in the water unchanged. The degassed water flows to storage. It is pumped into the boiler as feed water in a usual way.

In due course the zeolites become exhausted; i. e. become charged with sodium or other metallic cations. Valves 15 and 20 are then closed. Valves 29 and 35 are cracked open and pump 32 is started. Flue gas is forced into the softener under suitable pressure, 100 to 120 pounds per square inch (gauge) for example. At a pressure about five to six times atmospheric, flue gas (of maximum $CO_2$ content) gives a $CO_2$ concentration nearly equivalent to pure $CO_2$ at atmospheric pressure. The pressure in the tank is maintained by valve 35 and the net pressure is adjusted by manipulation of valve 35 and the pump pressure, with the aid of the pressure gauge 24. A slow trickle of water is injected by pump 38; usually just enough to keep the surfaces of the granules wet, but leaving the spaces between the granules open. The gas and water percolate through the zeolite body. Under the conditions specified, the gas dissolves quite freely in the wet films on the granules, forming carbonic acid (and sulfurous acid to the extent that $SO_2$ is present) which releases the sodium, calcium, etc. from the water.

The water trickling into the sump bottom 18 is, with proper regulation, a saturated solution of bicarbonate. This solution issues through waste outlet 28. Excess flue gas issues through outlet 34. It is best returned to the stack as shown, so as not to contaminate the boiler room.

In due course, the greater part or nearly all of the cations become removed from the zeolites and the bed is ready for another treatment cycle. The pumps 32 and 38 are then stopped and a flow of rinse water is directed through the container. As above stated, it is usually best for boiler operation to leave a small concentration of sodium sulfate in the water going to the boiler and to regenerate the carbonaceous hydrogen zeolite with this in view. This is done by leaving a little sodium in the zeolite, that is, by incomplete regeneration of the zeolite to the hydrogen condition. There is then in the water treating run a selective removal of the cations present as carbonate, any sulfuric and hydrochloric acids formed by the zeolite being reconverted to the salts. The softener may then be put immediately into operation again, but it is usual to backwash it at least after every few regenerations. In backwashing, valve 15 is closed and valve 30 is opened, and a strong flow of water from inlet pipe 30a is sent upward through the zeolite bed, lifting and agitating it, and removing any undesirable foreign matter. After backwashing the softener is put into operation again, as described.

As rather large amounts of high pressure gas are used, power can be saved by making the gas issuing from the container act on a machine instead of against throttle friction. In Fig. 2, I have shown such a modification, in which the effluent gas is made to help pump the influent gas. As shown, a compressor 40 is provided, conveniently of the rotary turbo type, driven by a motor 41 and serving to pump gas into the zeolite container through conduits 31 and 33. The effluent gas is passed through a conduit 42 to a turbine 43, arranged to help drive the compressor as shown. The turbine exhausts through conduit 44 leading, as shown, to the boiler stack. Other types of fluid compressors and fluid motors can be used.

In a modified form of flue gas regeneration in zeolitic softening or treatment of softened water by hydrogen exchange, both flue gas and water are passed upwardly through the granular zeolite body. For example, in an arrangement illustrated in Fig. 3, softened water containing sodium bicarbonate and sulfate is passed downwardly through a body of carbonaceous hydrogen zeolite granules in container 50, and for regeneration flue gas and water are passed upwardly through the zeolite container, replacing hydrogen in the zeolite by removal of the bases as bicarbonates and bisulfites. The zeolite body is supported by gravel layers upon a grid 51. The water for regeneration is pumped into the container near the bottom through a distributor 52 in the gravel and the flue gas taken from a boiler stack 11 is introduced by a pressure pump through a perforated header 53 just above the gravel, the perforations, as shown, directing the gas downwardly. A pressure throttle 54 holds a pressure in the container adequate for a relatively high concentration of $CO_2$ or carbonic acid in the water passing upwardly through container 51. The pressure is released at throttle 54 which discharges into separator 55 where excess gas is separated to be returned through conduit 56 to the stack, the solution charged with bicarbonate being run to waste through conduit 57 from the lower portion of the separator.

Incomplete regeneration leaving a little sodium in the zeolite is effective in allowing the sulfates to remain in the treated water and a little soda in the water used for regeneration is helpful in this respect, avoiding free mineral acidity in the treated water fed to the boiler.

The regenerating apparatus shown is suitable for utilizing weakly acidic gases from any source in carbonaceous hydrogen zeolite regeneration. Waste gases containing $CO_2$ and $SO_2$, either or both, may be used. In many industrial processes (fermentation, lime burning, magnesia manufacture, corn products and starch manufacture, ore roasting, etc.) such waste gases are available and their utilization in the present process, as described, is advantageous. In disposing of $SO_2$-containing gases, scrubbing of the gases with water is often required and liquors so obtained and containing sulfurous acid in solution are excellent regenerating agents for carbonaceous zeolites. In any case, the regenerating action is effected by carbonic or sulfurous acid in aqueous solution of the acidic gases, the relatively weak acids in solution reacting with the basic zeolite compounds to remove the base and to replace hydrogen in the zeolite.

What I claim is:

1. In a process of treating water to reduce the dissolved solids content thereof by bringing the water into contact with a bed of high capacity artificial, granular, carbonaceous zeolite, the steps comprising flowing water and a waste gas containing a substantial proportion of at least one acidic oxide from the group consisting of carbon dioxide and sulfur dioxide through said bed to regenerate the zeolite, and bringing said water into contact with the regenerated zeolite to reduce the dissolved solids content of the water.

2. In a process of treating water to exchange cations in the water for hydrogen ions by bringing the water into contact with a bed of high capacity artificial, granular, carbonaceous zeolite, the steps comprising flowing water and gaseous products of combustion containing gas of the group consisting of carbon dioxide and sulfur dioxide through said bed under a substantial superatmospheric pressure to regenerate the zeolite, and thereafter bringing said water into contact with the regenerated zeolite to produce an exchange of cations in a further quantity of the water for the hydrogen ions of said regenerated zeolite.

3. In a process of treating water to reduce the dissolved solids content thereof by bringing the water into contact with a bed of high capacity artificial, granular, carbonaceous zeolite, the steps comprising flowing water and gaseous products of combustion containing gas of the group consisting of carbon dioxide or sulfur dioxide through said bed under a pressure of the order of 100 pounds per square inch to regenerate the zeolite, and thereafter flowing said water through the regenerated bed to reduce the solids content of the water.

4. In a process of treating water to reduce the dissolved solids content thereof by bringing the water into contact with a bed of high capacity artificial, granular, carbonaceous zeolite, the steps comprising flowing gaseous products of combustion containing gas of the group consisting of carbon dioxide or sulfur dioxide through said bed under pressure to regenerate the zeolite, simultaneously flowing just sufficient water through the bed to provide thin aqueous films around the zeolite granules, and thereafter flowing the water to be treated through the regenerated bed.

5. In a process of exchanging cations in water for hydrogen ions by passing said water through a bed of a granular, carbonaceous, artifical zeolite prepared by subjecting organic material to the action of a strong dehydrating agent, the step of regenerating said zeolite after treatment of water for a period of time comprising passing a waste gas containing a substantial quantity of carbon dioxide through said bed under superatmospheric pressure, and simultaneously flowing through the bed a limited amount of water just sufficient to wash out bicarbonates formed by reaction of the zeolite with the regenerating gas.

6. In a process of exchanging cations in water for hydrogen ions by passing said water through a bed of a granular, carbonaceous, artificial zeolite prepared by subjecting organic material to the action of a strong dehydrating agent, the step of regenerating said zeolite after treatment of water for a period of time comprising passing a waste gas containing a substantial quantity of sulfur dioxide through said bed under superatmospheric pressure, and simultaneously flowing through the bed a limited amount of water just sufficient to wash out bisulfites formed by reaction of the zeolite with the regenerating gas.

7. Apparatus for treating water with a carbonaceous zeolite and for regenerating the zeolite comprising a closed container for a bed of the zeolite, means for passing water to be treated through said container, means for introducing gas into said container under pressure, and means for forcing a limited flow of water through the container while it contains gas under superatmospheric pressure.

8. Apparatus for treating water with a carbonaceous zeolite and for regenerating the zeolite comprising a closed container for a bed of the zeolite, a valved inlet and outlet for passing water to be treated through said container, means for withdrawing products of combustion from a flue and forcing the gas into said container under pressure, and means for forcing a stream of water through the container while it contains gas under superatmospheric pressure.

9. Apparatus for treating water with a carbonaceous zeolite and for regenerating the zeolite comprising a closed container for a bed of the zeolite, a valved inlet and outlet for passing water to be treated through said container, a compressor for forcing a regenerating gas through the container under pressure, a fluid motor connected to said compressor, means for exhausting gas from the container through said motor, and means for forcing water into the container while it contains gas under pressure.

HOWARD L. TIGER.